United States Patent
Kuhn et al.

(10) Patent No.: US 10,452,228 B2
(45) Date of Patent: Oct. 22, 2019

(54) METHOD AND DEVICE FOR DISPLAYING INFORMATION AND FOR OPERATING AN ELECTRONIC DEVICE SELECTIVELY INCLUDING ACTIVATED LIST ELEMENTS

(75) Inventors: Mathias Kuhn, Berlin (DE); Jan Michaelis, Berlin (DE); Alexander Hahn, Braunschweig (DE)

(73) Assignee: VOLKSWAGEN AG, Wolfsburg (DE)

(*) Notice: Subject to any disclaimer, the term of this patent is extended or adjusted under 35 U.S.C. 154(b) by 198 days.

(21) Appl. No.: 14/344,325

(22) PCT Filed: Sep. 11, 2012

(86) PCT No.: PCT/EP2012/003806
§ 371 (c)(1),
(2), (4) Date: Mar. 12, 2014

(87) PCT Pub. No.: WO2013/037476
PCT Pub. Date: Mar. 21, 2013

(65) Prior Publication Data
US 2014/0344690 A1    Nov. 20, 2014

(30) Foreign Application Priority Data
Sep. 12, 2011 (DE) .......... 10 2011 112 823

(51) Int. Cl.
*G06F 3/0482* (2013.01)
*G06F 3/0488* (2013.01)
(Continued)

(52) U.S. Cl.
CPC .......... *G06F 3/0482* (2013.01); *G06F 3/041* (2013.01); *G06F 3/0488* (2013.01);
(Continued)

(58) Field of Classification Search
CPC .................................. G06F 3/0482
See application file for complete search history.

(56) References Cited

U.S. PATENT DOCUMENTS

| | | | |
|---|---|---|---|
| 2002/0015064 A1* | 2/2002 | Robotham | G06F 3/0481 715/863 |
| 2004/0093155 A1* | 5/2004 | Simonds | H04L 67/12 701/532 |

(Continued)

FOREIGN PATENT DOCUMENTS

| | | |
|---|---|---|
| CN | 101635768 A | 1/2010 |
| DE | 19941956 A1 | 3/2001 |

(Continued)

OTHER PUBLICATIONS

Trevor Sheridan, "Groove for iPad", Jul. 15, 2011, Apple'n'Apps, All pages.*

(Continued)

*Primary Examiner* — Kieu D Vu
*Assistant Examiner* — Roberto Borja
(74) *Attorney, Agent, or Firm* — Barnes & Thornburg LLP

(57) ABSTRACT

A method and a device for displaying information and for operating an electronic device in a vehicle, wherein a plurality of list elements are displayed on a display surface with a touch-sensitive surface; a contact of a list element on the touch-sensitive surface with an actuating object or an approach of the actuating object to the list element is detected, whereupon the list element is activated, and after the activation of the list element, a first swiping movement of the actuating object on or in the vicinity of the touch-sensitive surface is detected, and with or after the detection of the first swiping movement of the actuating object, at least the list elements which are not activated are removed from the display surface and a multimedia additional element associated with the activated list element is inserted into the display surface.

23 Claims, 6 Drawing Sheets

(51) Int. Cl.
*G06F 3/041* (2006.01)
*B60K 35/00* (2006.01)
*B60K 37/06* (2006.01)

(52) U.S. Cl.
CPC ......... *G06F 3/04883* (2013.01); *B60K 35/00* (2013.01); *B60K 37/06* (2013.01); *B60K 2370/11* (2019.05); *B60K 2370/141* (2019.05); *B60K 2370/146* (2019.05); *B60K 2370/1438* (2019.05); *B60K 2370/1464* (2019.05)

(56) References Cited

U.S. PATENT DOCUMENTS

| | | | |
|---|---|---|---|
| 2008/0122796 A1* | 5/2008 | Jobs | G06F 3/0488 345/173 |
| 2008/0158189 A1* | 7/2008 | Kim | G06F 3/04886 345/173 |
| 2009/0002335 A1* | 1/2009 | Chaudhri | G06F 3/04815 345/173 |
| 2009/0313567 A1* | 12/2009 | Kwon | G06F 3/0482 715/769 |
| 2010/0013780 A1* | 1/2010 | Ikeda | G06F 3/04883 345/173 |
| 2010/0058253 A1* | 3/2010 | Son | G06F 1/1616 715/863 |
| 2010/0228740 A1* | 9/2010 | Cannistraro | G06F 17/30749 707/748 |
| 2011/0083105 A1* | 4/2011 | Shin | G06F 3/0482 715/830 |
| 2011/0124376 A1 | 5/2011 | Kim et al. | |
| 2011/0128241 A1* | 6/2011 | Kang | G06F 1/1643 345/173 |
| 2011/0191685 A1* | 8/2011 | Bamford | G06F 3/0482 715/730 |
| 2011/0205248 A1* | 8/2011 | Honda | G06F 3/0482 345/661 |
| 2011/0283212 A1* | 11/2011 | Warner | G06F 3/0488 715/769 |
| 2012/0304074 A1* | 11/2012 | Ooi | G06F 3/04895 715/752 |
| 2013/0187873 A1* | 7/2013 | Jeong | G06F 3/0488 345/173 |

FOREIGN PATENT DOCUMENTS

| | | |
|---|---|---|
| DE | 102006032118 A1 | 1/2008 |
| DE | 102009057081 A1 | 6/2011 |
| EP | 2166445 A2 | 3/2010 |
| EP | 2354913 A2 | 8/2011 |
| KR | 1020100095256 | 8/2010 |
| WO | WO 2011001001 A1 * | 1/2011 ........... G06F 3/0481 |

OTHER PUBLICATIONS

Search Report for International Patent Application No. PCT/EP2012/003806; dated Mar. 5, 2013.

Chinese Office Action in corresponding application 201280055530.5, dated Apr. 6, 2016.

\* cited by examiner

METHOD AND DEVICE FOR DISPLAYING INFORMATION AND FOR OPERATING AN ELECTRONIC DEVICE SELECTIVELY INCLUDING ACTIVATED LIST ELEMENTS

PRIORITY CLAIM

This patent application is a U.S. National Phase of International Patent Application No. PCT/EP2012/003806, filed 11 Sep. 2012, which claims priority to German Patent Application No. 10 2011 112 823.2, filed 12 Sep. 2011, the disclosures of which are incorporated herein by reference in their entirety.

SUMMARY

Illustrative embodiments relate to a method for displaying information and for operating an electronic device, particularly in a motor vehicle. Illustrative embodiments also relate to a facility which is suitable for performing this method.

BRIEF DESCRIPTION OF THE DRAWINGS

Disclosed embodiments will now be explained with reference to the drawings, in which.

DETAILED DESCRIPTION OF THE DISCLOSED EMBODIMENTS

Figure 1:
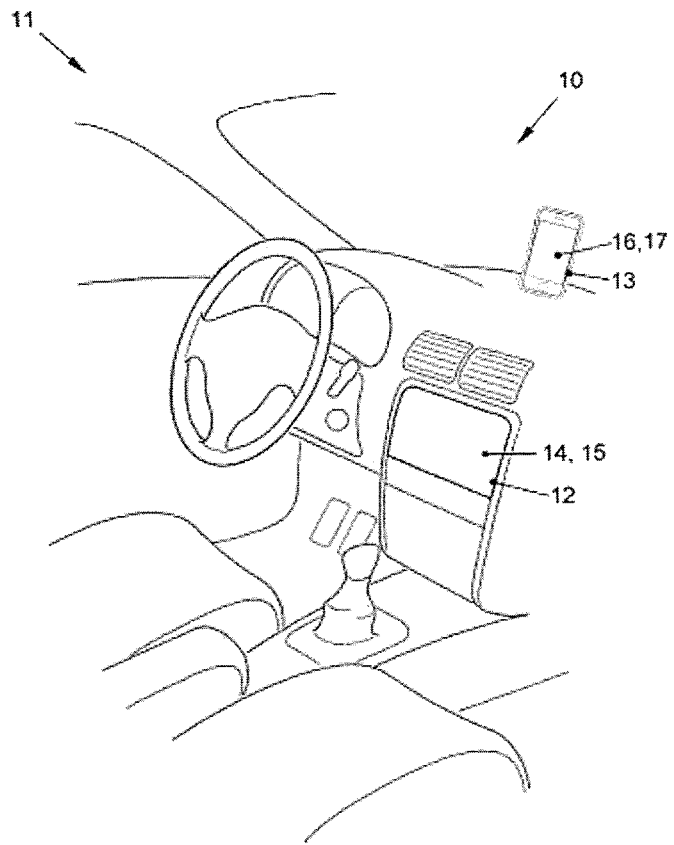
FIG. 1 shows the cockpit of a vehicle which is equipped with two variants of a device for displaying information and for operating an electronic device according to an exemplary embodiment.

Displaying information in a vehicle results in very special requirements. Information is picked up in the vehicle, inter alia by the driver. The information should thus be represented in the vehicle in such a manner that the information pickup by the driver does not lead to a distraction whilst driving. The information shown should thus be detectable intuitively and rapidly by the driver so that he needs to take his eye away from the driving situation only for a very short time for the information pick up. If the operation of the vehicle facilities is supported or guided by a display, the display should be such that the driver needs to look at the display only for a very short time for the operation to perform the operation.

The overall information is frequently provided via a plurality of different application programs (so-called "apps"). This includes simple contents, for example current news, newspaper articles, image processing, text processing, computer game and music selection and reproduction apps which provide for an efficient utilization of web applications by means of a display area of an electronic device. Such display areas are equipped with a touch-sensitive surface and are called touchscreens. Such a touchscreen is operated by the user touching the touchscreen with his finger tip.

In a music selection and reproduction app, the overall information can relate to, for example, a list having a plurality of list entries of audio or video reproduction. Of the overall list, a subset of the list entries is displayed. By means of an operating process, the user can cause scrolling to display other list entries. In the case of many electronic devices (e.g. an iPhone by the company Apple, Inc.), there is an operating line for list entries at the lower edge of the display area.

When such electronic devices are used, however, the ergonomic disadvantage arises that the operating and display area is too small to allow reliable operation by the driver when driving.

Illustrative embodiments provide a method and a device which provides for a simple operation of the electronic device when driving.

Accordingly, disclosed embodiments relate to a method for displaying information and operating an electronic device in a vehicle, wherein a plurality of list elements are displayed on a display area with a touch-sensitive surface, a contact of a list element on the touch-sensitive surface with an actuating object is detected, whereupon the list element is activated, and after the activation of the list element, a first swiping movement of the actuating object on or in the vicinity of the touch-sensitive surface is detected, and on or after the detection of the first swiping movement of the actuating object, at least the non-activated list elements are pushed out of the display area and an additional multimedia element allocated to the activated list element is pushed into the display area.

In this context, the additional multimedia element can correspond to a detailed representation of the activated list element in the widest sense. If, for example, the list is a list with music titles, the additional multimedia element can be, for example, a cover representation of the selected music title. If the list entries are, for example, headlines of news messages or subject lines of incoming email messages, the additional multimedia element can represent a detailed news text. The additional multimedia element can be quite generally an additional graphical element, an additional text element, a video element or combinations of such elements.

The method allows a simple change between a list representation of information and a detailed representation of an individual list element which can also be performed by the driver of a motor vehicle without his attention when driving the vehicle being impaired. According to the disclosed embodiments, a list element is activated and after activation of the list element, a swiping movement produces scrolling, optionally of the entire list, but at least of the non-activated list elements, out of the display area and scrolling-in of a detailed view allocated to the activated list element, which is represented by the additional multimedia element.

A touch-sensitive surface is understood to be, on the one hand, a touch-sensitive screen operating resistively or capacitively in the narrower sense. On the other hand, the disclosed embodiments can also be applied in the case of surfaces of a display area which already respond to the approach of an actuating object, for example via proximity sensors so that there does not need to be a direct contact with the surface for activating a list element and for detecting the swiping movement.

As the actuating object for handling the touch-sensitive surface, a touch pad pin or a finger of the user can be used, for example.

According to at least one disclosed embodiment of the method, the list element is not activated immediately on registration of a contact but only when the actuating element the list element at least during a first. When a proximity sensor is used, the list element is activated when the actuating element is located at the level of the list element in the immediate vicinity above the display area during the period T1. This is sufficient for the user to be able to correct a wrongly cited list entry by briefly lifting his finger without the list entry being activated immediately, which facilitates the operation whilst driving because the main attention of the driver, of course, is always directed to driving the vehicle and otherwise, the unintended selection of a list element may easily occur.

According to the prior art, touching a list on a touch-sensitive screen immediately followed by a swiping movement usually triggers scrolling within the list. Such a functionality, known per se, is also implemented in the disclosed method. Scrolling within the list is triggered when a contact is followed by a swiping process within a second period T2.

The period T1 which triggers the activation of a list element must therefore be selected to be greater than the period T2. For example, the period T1 for activating a list element can be about 100 or 200 ms whereas the period T2 for triggering a scrolling movement is less than 100 ms or less than 50 ms.

According to another disclosed embodiment of the method, the change from the list representation to the detailed representation is carried out by at least the non-activated list elements being pushed out of the display area and an additional multimedia element allocated to the activated list element being pushed into the display area when the first swiping movement of the actuating object takes place at least over a minimal distance S on the touch-sensitive surface. It can be provided, for example, that the additional multimedia element is represented only partially before reaching the minimal distance S and the display returns to the original list representation (for example snaps back in a type of elastic scrolling movement) when the actuating object is removed from the touch-sensitive surface before reaching the minimal distance S. When the minimal distance S is reached, in contrast, it can be provided that the list representation disappears completely from the display area and the detailed view represented by the additional multimedia element locks in on the display area. The user can thus correct his selection by means of the additional information, if necessary, and simply return to the list view already during the scrolling-in movement of the detailed view.

The direction of the swiping movement can be specified by the software depending on the position and orientation of the display area with respect to the user. For example, it can also be provided to insert different additional multimedia elements depending on the direction of the swiping movement. However, the first swiping movement may be carried out downward on the touch-sensitive surface to change from the list view into the detailed view so that the same gesture familiar to the user can be used for scrolling within the list when the list element is not activated or changing into the detailed view when the list element is activated.

If the additional multimedia element, for example the cover representation, is already shown, this additional multimedia element can be advantageously activated again by a contact with the actuating object, for example during a period T1 and by a second swiping movement of the actuating object, a further additional multimedia element allocated to the activated list element can be displayed or the list representation can be returned to. A further additional multimedia element can be, for example, a song text or current band information.

Displaying the further additional graphical element can be triggered, for example, by a second swiping movement which is carried out in the same direction as the first swiping movement. By contrast, returning to the list representation can be triggered by a second swiping movement which occurs in the opposite direction to the first swiping movement. It is thus possible to select a plurality of detailed views in succession. It can also be provided that, after reaching the last detailed view allocated to a list element, it is not necessary to return to all detailed views to reach the list representation, but rather that a swiping movement in the direction of the first swiping movement again also leads to the detailed view if there are no longer any further detailed views.

If the user has activated a list element by actuating the touch-sensitive surface during a period T1, the activation of the list element may be displayed by a changed representation of the list element so that the user immediately recognizes whether the activation was successful. As an alternative or additionally, there can also be an acoustic acknowledgement of the activation. The changed representation can be effected, for example, by a changed coloring of the list element. According to at least one disclosed embodiment of the method, each list element consists of a plurality of part-segments and the activation of the list element is displayed by a changed representation of at least one of the part-segments. As a result, the essential list information can continue to be displayed whilst the activation of the list element becomes detectable also from the angle of view of the driver without him having to direct his full attention to the display area. For example, one of the part-segments can correspond to a smaller representation of the additional multimedia elements allocated to the list elements, wherein the part-segments of the non-activated list elements are displayed only partially and the part-segment of the activated list element is displayed completely.

Optionally, it is possible to display in addition to the list elements and the additional multimedia elements additional operating elements to which buttons, activatable by the actuating element, on the touch-sensitive surface are allocated. In the case of the additional operating elements, a music playback application can be, for example, start/stop buttons, forward and return buttons and/or fast-forward and rewind buttons. The operating elements may be displayed in the list representation above the list elements. In the detailed view, the operating elements may be displayed below the additional multimedia element. In this variant, the operating elements are scrolled in and out together with the list representation and the detailed view.

The activated list element may remain displayed as list element also in the detailed view so that the detailed view, in at least one disclosed embodiment of the method, comprises the additional multimedia element, the list element and further operating elements. This ensures, for example, with a music playback application, that apart from the cover, the text information such as interpreter and title also remains displayed.

Disclosed embodiments also relate to a device for displaying information and for operating an electronic device comprising a display device with a display area, a touch-sensitive surface which is formed on the display area, and a control device which is coupled to the display device and the touch-sensitive surface, on the one hand, and the electronic device to be operated, on the other hand. In this context, the control device is designed for performing the method, described hereinabove, for example by loading a correspondingly-programmed application software.

The electronic device ( ) operated by the device may be an infotainment system or especially the audio system of a vehicle, for example of a motor vehicle.

The device can then be an integrated component part of the infotainment system of the vehicle and operated, for example, via a touch-sensitive screen belonging to the infotainment system. As an alternative, however, the device can also be a mobile device communicating with the infotainment system of the vehicle, in particular a mobile telephone, a smartphone or a personal digital assistant (PDA).

FIG. 1 shows the cockpit 10 of a vehicle 11 which is equipped with two variants 12, 13 of a device for displaying information and for operating an electronic device according to at least one disclosed embodiment.

According to at least one disclosed embodiment, the device is integrated in an infotainment system 12 of the vehicle 11. The infotainment system 12 comprises for this purpose a display 14 used as display area, particularly for the graphical representation of graphical lists, images and other multimedia objects. The display 14 can be any display known in accordance with the prior art and suitable for this purpose, which is arranged at a central position in a cockpit, e.g. in the upper area of the center console.

The display 14 may be equipped with a touch-sensitive surface 15 via which various operating gestures of the user can be detected which, for example, are carried out with a touch pad pin or a finger. Instead of the touch-sensitive surface 14, other input means can also be provided which are capable of detecting operating gestures of the user, for example proximity sensors (not shown) which can detect the movements of a pin or of a finger without the latter actually having to touch the surface of the display 14.

As an alternative, however, the infotainment system can also be operated by means of a conventional smartphone 13. The smartphone 13 has in a manner known per se a display 16 with a touch-sensitive surface 17 via which operating gestures of the user can be detected. The method can be stored in a loadable application program (a so-called "app") in the smartphone. Information and control data are exchanged via a data link between the infotainment system 12 of the vehicle 11 and the smartphone 13. For this purpose, the infotainment system 12 can comprise, for example, a docking station (not shown) for the smartphone 13. As an alternative, the data exchange can also take place via a USB link or wirelessly via a Bluetooth connection.

Figure 2:
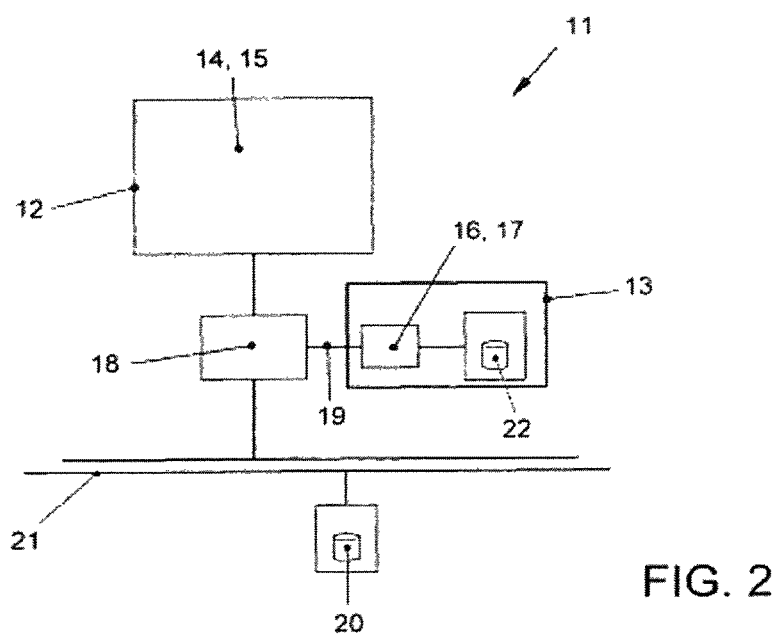
FIG. 2 shows diagrammatically the structure of a device for displaying information and for operating an electronic device according to an exemplary embodiment.

FIG. 2 diagrammatically shows the structure of the device for displaying information and for operating an electronic device according to the two variants shown in FIG. 1.

The infotainment system 12 of the vehicle 11 is controlled either via the touch-sensitive surface 15 of the display 14 of the infotainment system 12 itself or via the touch-sensitive surface 17 of the display 16 of the smartphone 13. For this purpose, the infotainment system 12 and/or the smartphone 13 comprises a control unit 18 which is connected to the display 14, 16. In the case of the smartphone 13, the data link 19 can also be a wireless data link. When a smartphone is used, the control unit 18 can also be constructed to be distributed over the smartphone and the infotainment system.

The data, for example a music database, from which the information represented on the displays 14, 16 are generated can be stored in a data memory 20 of the infotainment 12 which can be accessed, for example, via a data bus 21 of the vehicle 11. As an alternative or additionally, the data can also be stored in an internal memory 22 of the smartphone 13.

The graphical lists are generated from databases 20, 22 by the databases or a subset thereof being sorted hierarchically in accordance with one or more sorting criteria and represented as graphical lists. This can be, for example, a music collection, current news, emails, a destination address file, a person file or a telephone book.

Figure 3:
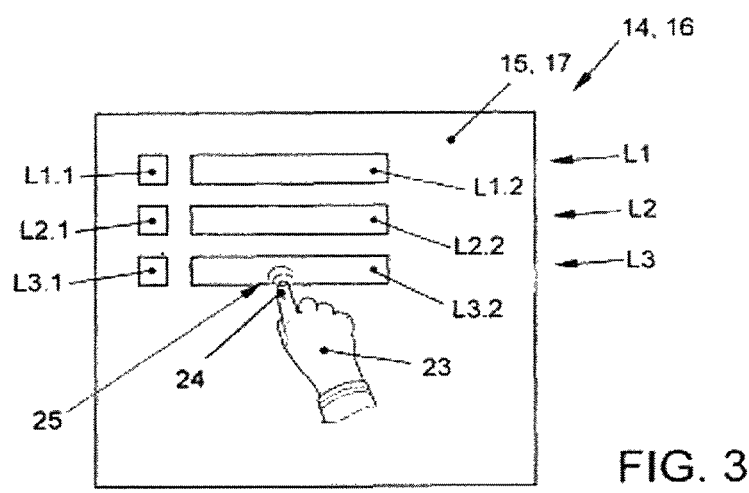
FIG. 3 shows diagrammatically a list representation of information on a touch-sensitive screen of a device for displaying information and for operating an electronic device.

FIG. 3 shows diagrammatically a list representation of information on the display 14, 16 with the touch-sensitive surface 15, 17 of the device for displaying information and for operating an electronic device.

In the example shown, the list elements L1, L2, L3 consist in each case of part-elements L1.1, L1.2, L2.1, L2.2, L3.1, L3.2, each of which can be represented differently depending on the activation of a list entry. Furthermore, the hand 23 of a user is shown diagrammatically who touches the touch-sensitive surface 15, 17 with his finger 23 at a contact point 24 at the level of the list element L3 to activate the list element.

Figure 4:
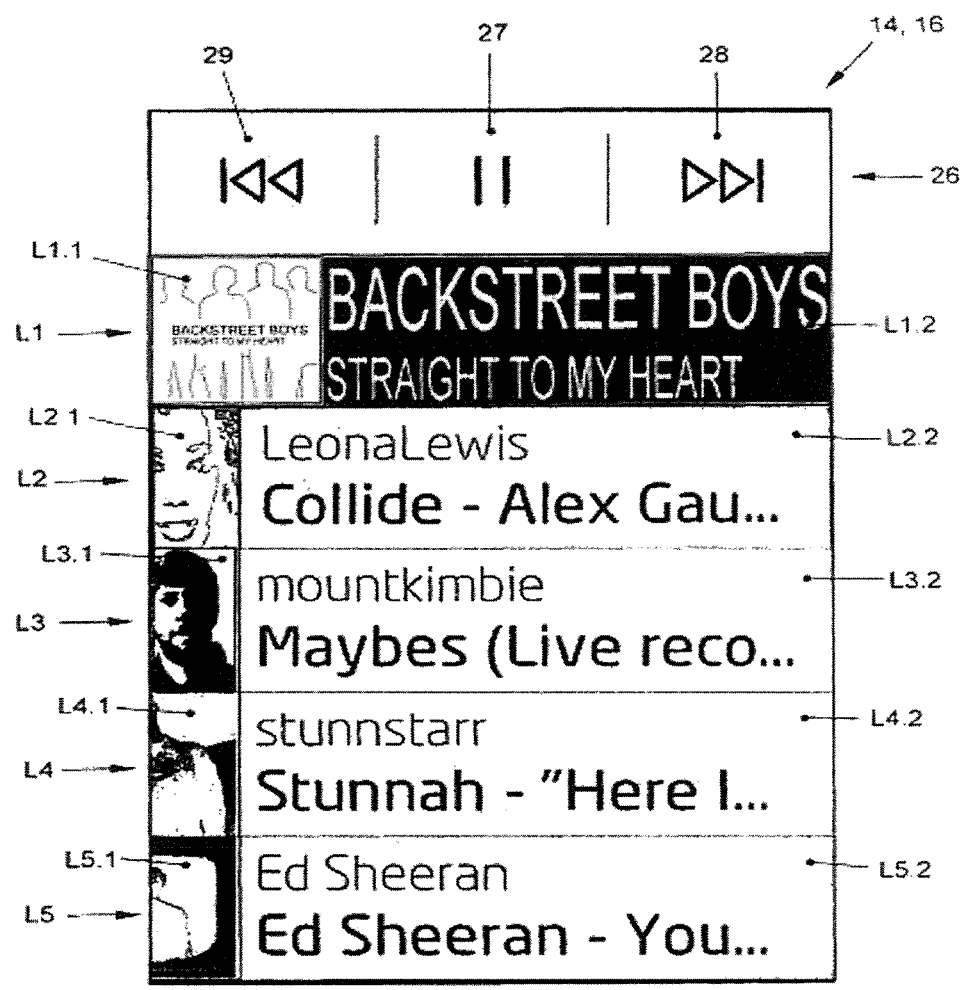
FIGS. 4-6 illustrate the method and the device for displaying information and for operating an electronic device by means of the change between a list representation of musical items and a cover representation of a selected musical item in a music playback application of an infotainment system for a motor vehicle.
Figure 5:
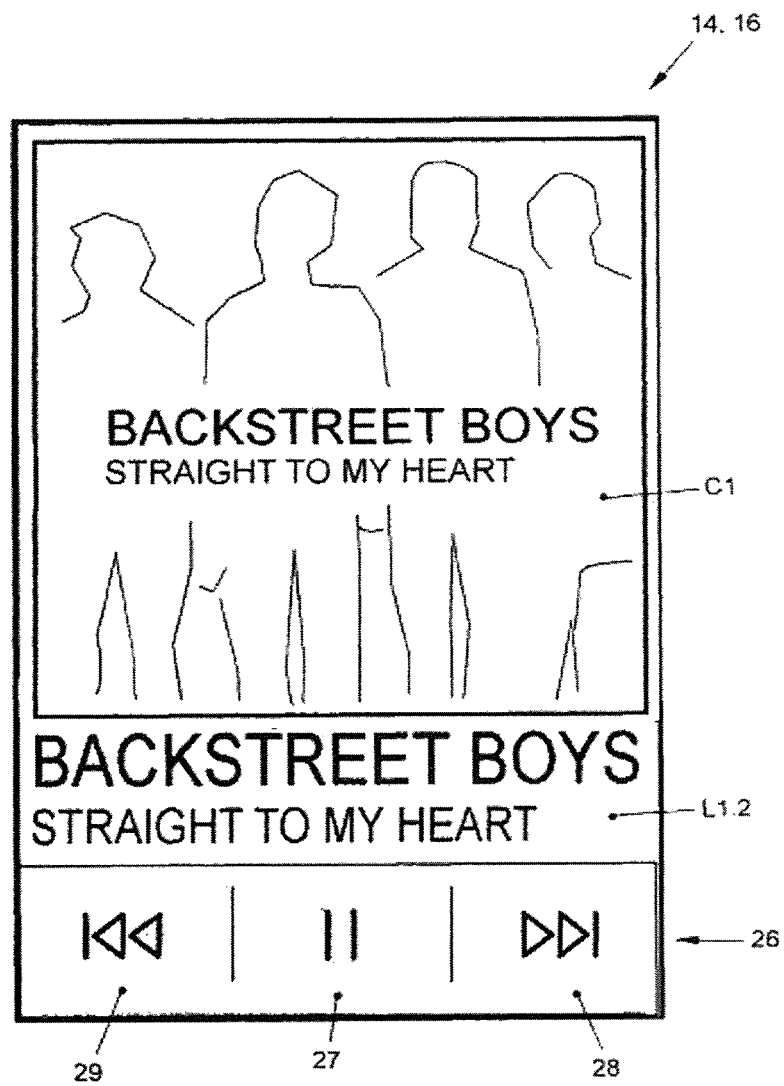
Figure 6:
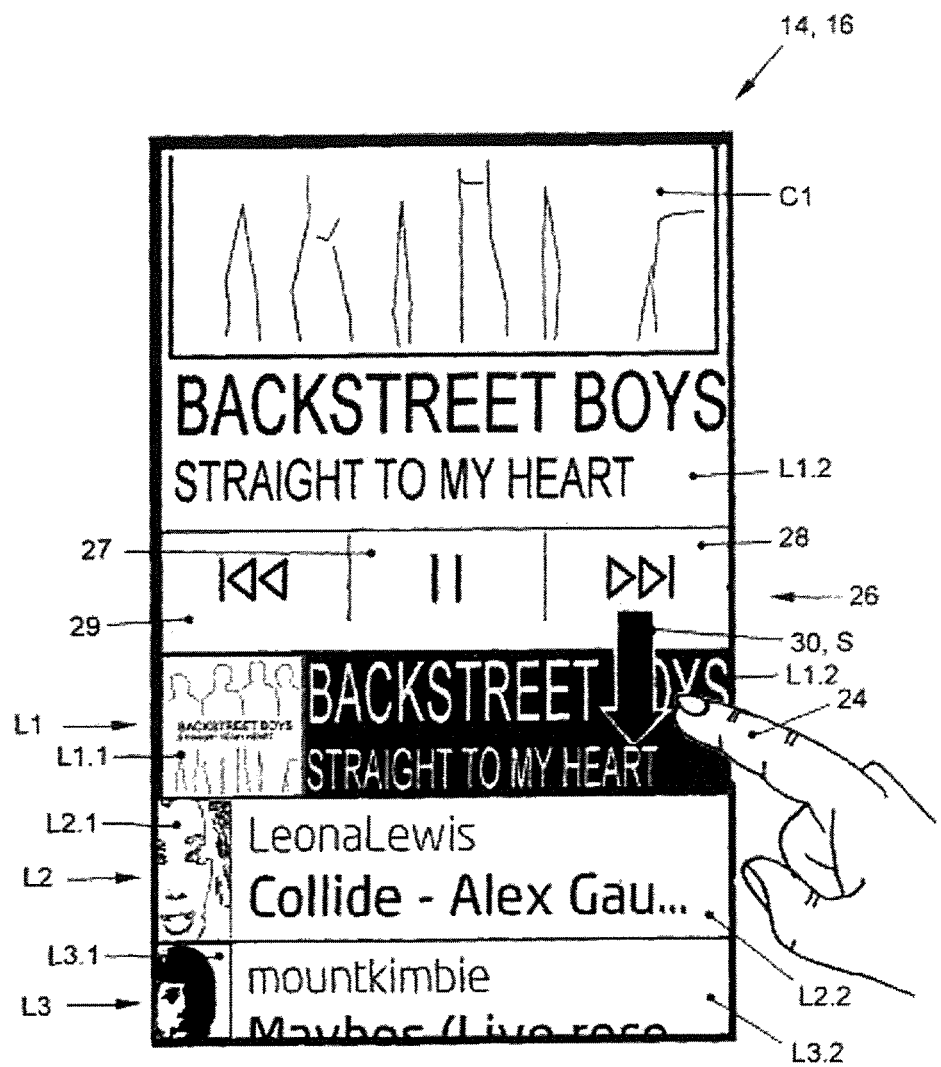

FIGS. 4-6 illustrate the method and the device for displaying information and for operating an electronic device by means of the change between a list representation of musical items and a cover representation of a selected musical item in a music playback application of an infotainment system for a motor vehicle.

FIG. 4 shows a music selection and reproduction app with a list representation of music titles L1, L2, L3, LA, L5 with an operating line 26 which is located in the upper area of the display 14, 16. The operating line 26 contains important control elements such as, e.g., "play"/"pause" 27, "play next title" 28 and "play previous title" 29, but other operating elements are also not excluded. In the example shown, the "play" control element alternates with the "pause" control element 27 shown, just when a music title is being played. The number of operating elements may be limited to a small number (e.g. one to five control elements) to reliably provide for an operation by the driver also when he is driving.

A list view may contain a list of a plurality of music titles L1, L2, L3, L4, L5, a CD cover being allocated to each music title (represented by means of the CD cover C1 which is allocated to the first list entry), and text information items.

In the disclosed embodiment, each list element is structured in two parts and comprises a first part-element L1.1, L2.1, L3.1, L4.1, L5.1 and a second part-element L1.2, L2.2, L3.2, L4.2, L5.2, which in each case can be changed in their representation independently of one another. In the example shown, the part-elements L1.1, L2.1, L3.1, L4.1, L5.1 are allocated to smaller views of the CD cover, that is to say, for example to CD cover C in the case of element L1.1. The part-elements L1.2, L2.2, L3.2, L4.2, L5.2 display in each case text information such as interpreter and title.

In another disclosed embodiment, in the case of a selection of a list element L1, the selected list view is changed. The selected list element is changed here by changing the background color and/or the color of the lettering of the part-element L1.2 and/or changing a CD cover image L1.1. The CD cover image can be changed, in particular in such a manner that the CD cover image is represented as a larger and/or more complete image. In FIG. 4, it is shown that the music title L1 has been selected. In this context, the CD cover image C1 is shown as a complete image in part-element L1.1. For the music titles L2, L3, L4, L5 not selected, only half of the respective CD cover image L2.1, L3.1, L4.1, L5.1 is shown. If, for example, a music title is newly selected, the newly selected CD cover image is shown as a complete image. Changing the CD cover image is advantageous since a selected music title is immediately recognizable and in the case of music titles not selected, the area for the text information is enlarged. Due to this simplified perceptibility, the distraction of the driver during the operation is reduced so that operation whilst driving is possible.

Furthermore, FIG. 5 shows a CD cover image C1 which is allocated to the currently selected music title L1, in a detailed view. In addition, the text information allocated to the music title is shown which can correspond, for example, to the part-element L1.2. At the lower end of the display area, the operating line 26 is shown. The advantageous factor in this view is the clear representation and simple operability so that operation by the driver whilst driving is possible.

FIG. 6 shows a process for changing from the list view according to FIG. 4 to the detailed view according to FIG. 5 by an operating process by the user.

Figure 7:
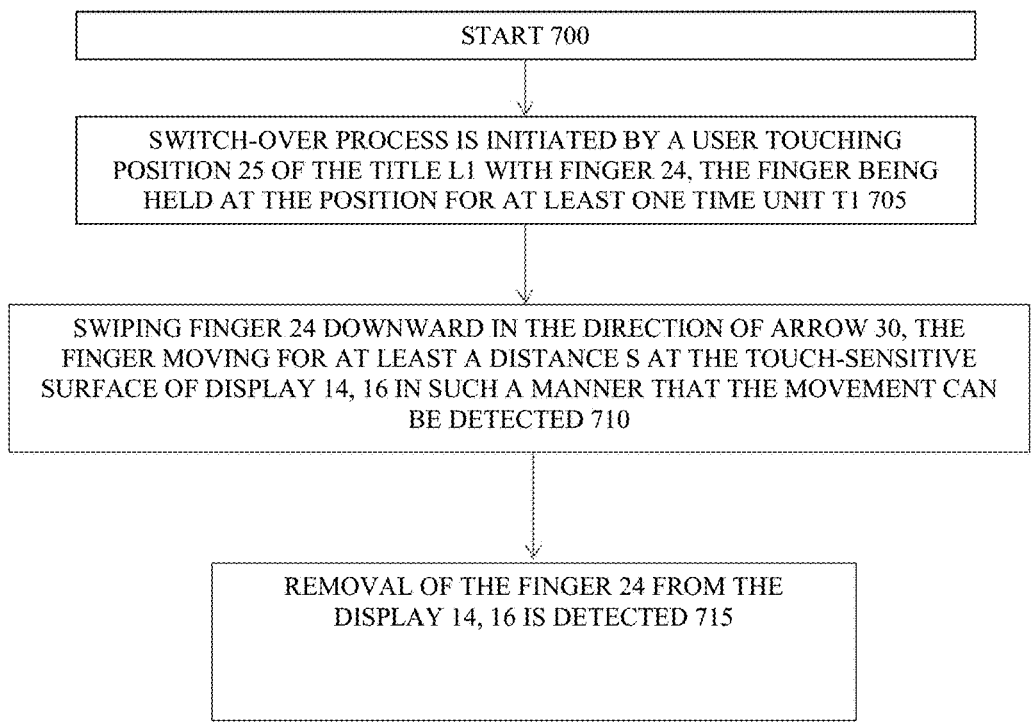
FIG. 7 illustrates the transition from the previous list view or detailed view to the "additional graphical element" as a flow chart indicating the sequence of operating steps so as to illustrate transitioning between various views.

Starting with the list view according to FIG. 4, the operating process comprises the following operating steps also illustrated in FIG. 7, which illustrates the transition from the previous list view or detailed view to the "additional graphical element" as a flow chart indicating the sequence of operating steps. As shown in FIG. 7, the operations start at 700 and control proceeds to 705 at which the switch-over process is initiated by a user touching position 25 of the title L1 with finger 24, the finger being held at the position for at least one time unit T1. Control then proceeds to 710, in which swiping finger 24 downward in the direction of arrow 30, the finger moving for at least a distance S at the touch-sensitive surface of display 14, 16 in such a manner that the movement can be detected. Control then proceeds to 715, at which removal of the finger 24 from the display 14, 16 is detected.

During the swiping, the list view L1, L2, L3, . . . with the operating field 26 arranged at the top moves downward. From the top, text information L1.2 and detailed view C1 follow so that the operating field 26 is located between the list view and the detailed view. As soon as the operating process has been detected by the device, the list view changes into the detailed view. The list view scrolls away downward, the detailed view scrolls in from the top. During this process, the operating field scrolls downward, remaining between the list view and detailed view. As soon as the operating field has reached the lower end of the display, the scrolling process is ended. The operating field "locks in" at this point and stops. The process of changing from the list view into the detailed view is ended.

According to the disclosed embodiments, time unit T1 is longer than a time unit T2. A time unit T2 corresponds to the time unit which, according to the prior art, a scrolling within a list by a swiping.

A change from the detailed view according to FIG. 5 into the list view according to FIG. 4 is correspondingly effected in the reverse order by touching the detailed view and swiping upward. As soon as the operating field has reached the upper end of the display, the scrolling process is ended. The operating field "locks in" at this point and stops. The process of changing from the detailed view into the list view is ended.

In a further disclosed embodiment, this vertical change of views is expanded by at least one further view. In this context, it is not necessary that the at least one further view has the operating field 26. A change from the detailed view to the at least one further view is effected by touching the detailed view C1, the finger being held at the point for at least the time unit T1, and swiping downward. If the at least one further view does not have an operating field 26 the changing process ends when the at least one further view is scrolled in completely into the display area.

A change from the list view to the at least one further view is effected by touching the detailed view, the finger being held at the point for at least a time unit T1, and swiping upward.

According to the disclosed embodiments, further views can be correspondingly supplemented so that changing the views by means of the methods described above is cyclically possible.

In another disclosed embodiment, the at least one further view is a view and operating element for a voice recording for voice notices, conversations or recording of music.

According to the disclosed embodiments, the device is a mobile device, for example a mobile telephone, smartphone, PDA, but other mobile devices with touchscreen can also be used. It is also provided that the electronic device represents an infotainment system in a motor vehicle. According to the disclosed embodiments, the electronic device is designed for carrying out the method described above.

In a modern vehicle, various sets of information are displayed and handled. Information is represented in many cases by a subset of the overall information being displayed on a display area of an electronic device and/or infotainment system in the vehicle and the user being able to handle the subset.

To be able to display the varied items of information flexibly, freely programmable displays are used, e.g., which frequently also handle the reproduction of conventional mechanical instruments. In DE 10 2006 032 118 A1, for example, a combined instrument for a motor vehicle is described, which comprises a display by means of which the speed of the motor vehicle, the speed of the engine of the motor vehicle, the temperature of the engine of the motor vehicle, the tank contents and/or the time can be displayed variably. In addition, it is possible to display information of a navigation system, of a telephone, of a musical system, of an infotainment system and/or of an air-conditioning system.

In addition to the combined instrument, a display device is frequently arranged above the center console of the vehicle by which further information can be displayed. This display device is used, in particular, as multi-function display and for representing a geographic map of a navigation system. Such a multi-function display is described, for example, in DE 199 41 956 A1.

From DE 10 2009 057 081 A1, a method for providing a user interface is known, in which buttons are shown on a display area. Such a button is used as control element of a graphical user interface. In the method, an input gesture is detected on a touch-sensitive surface, various parameters of the contact being detected. The graphical representation on the display area is changed based on these parameters.

LIST OF REFERENCE DESIGNATIONS

10 Cockpit
11 Vehicle
12 Infotainment system

13 Smartphone
14 Display of the infotainment system 12
15 Touch-sensitive surface of display 14
16 Display of the smartphone 13
17 Touch-sensitive surface of display 16
18 Control unit
19 Data link
20 Memory of vehicle 11
21 Data bus
22 Memory of the smartphone 13
23 Hand
24 Finger
25 Contact point
26 Operating line
27 Play/pause field
28 Next title field
29 Previous title field
30 Arrow
C1 Additional multimedia element
L1-L5 List elements
L1.1-L5.1 Part-segments
L1.2-L5.2 Part-segments

The invention claimed is:

1. A method for displaying multimedia information on an electronic device in a vehicle, the method comprising:
displaying a plurality of multimedia list elements in a list view on a display area having a touch-sensitive surface;
detecting a contact of a multimedia list element of the plurality of multimedia list elements on the touch-sensitive surface by an actuating object or an approach of an actuating object to the displayed multimedia list element of the displayed plurality of multimedia list elements;
activating the multimedia list element in response to the detection of the contact of the displayed multimedia list element by the actuating object for at least a first period T1 or in response to the actuating object being located at a level of the multimedia list element in an immediate vicinity above the touch-sensitive surface of the display area for the first period T1, wherein upon activating the multimedia list element a number of multimedia control elements are displayed at an edge of the display area together with the plurality of multimedia list elements;
detecting, after the activation of the multimedia list element, a first swiping movement of the actuating object on, or in the vicinity of, the touch-sensitive surface that takes place at least over a minimum distance S during a second time period T2; and
in response to the detection of the first swiping movement of the actuating object, removing at least non-activated multimedia list elements entirely from the display area and, simultaneously, inserting into the display area an additional multimedia element comprising further information allocated to the activated multimedia list element, such that, during the first swiping movement of the actuating object, the additional multimedia element is moved partially into the display area as the non-activated multimedia list elements move out of the display area until completion of the detected first swiping movement, wherein the number of multimedia control elements are moved into the display area in correspondence with the additional multimedia element during the first swiping movement, wherein the number of multimedia control elements are arranged at a second position, in response to the detection of the first swiping movement, further wherein the display area snaps back to the list view, and the number of multimedia control elements move together with the plurality of multimedia list elements when the actuating object is removed from the touch-sensitive surface before completion of the detected first swiping movement.

2. The method of claim 1, wherein the first swiping movement is carried out downward on the touch-sensitive surface.

3. The method of claim 1, wherein the additional multimedia element is activated by a contact with the actuating object and, by a second swiping movement of the actuating object, a further additional multimedia element comprising further information allocated to the activated multimedia list element can be displayed or the list view can be returned to.

4. The method of claim 3, wherein the further additional multimedia element is displayed by a second swiping movement in the direction of the first swiping movement.

5. The method of claim 3, wherein the list view is returned to by a second swiping movement in the opposite direction to the first swiping movement.

6. The method of claim 1, wherein the activation of the multimedia list element is displayed by a changed representation of the multimedia list element.

7. The method of claim 6, wherein each multimedia list element consists of a plurality of part-segments and the activation of the multimedia list element is displayed by a changed representation of at least one of the part-segments.

8. The method of claim 7, wherein one of the part-segments corresponds to a smaller representation of the additional multimedia elements comprising further information allocated to the multimedia list elements, wherein the part-segments of the non-activated multimedia list elements are displayed only partially and the part-segment of the activated multimedia list element is displayed completely.

9. The method of claim 1, wherein the number of the multimedia control elements are displayed as buttons, activatable by the actuating object, on the touch-sensitive surface.

10. The method of claim 9, wherein the the number of multimedia control elements are displayed above the multimedia list elements.

11. The method of claim 9, wherein the the number of multimedia control elements are displayed below the additional multimedia element.

12. The device of claim 1, wherein the number of multimedia control elements are arranged between the additional multimedia element and the non-activated multimedia list elements during movement onto the display area.

13. The device of claim 1, wherein in response to the detection of the first swiping movement of the actuating object, the number of multimedia control elements are arranged at an opposite edge of the display area.

14. A device for displaying multimedia information on an electronic device, the device comprising:
a display device having a display area;
a touch-sensitive surface which is formed on the display area; and
a control device which is coupled to the display device and the touch-sensitive surface, on the one hand, and the electronic device to be operated, on the other hand, wherein the control device is designed for performing the method comprising:
displaying a plurality of multimedia list elements as a list view on the display area having the touch-sensitive surface;

detecting a contact of a multimedia list element of the plurality of multimedia list elements on the touch-sensitive surface by an actuating object or an approach of an actuating object to the displayed multimedia list element, and activating the multimedia list element in response to the detection of the contact of the multimedia list element for a first period T1 or in response to the actuating object being located at the level of the multimedia list element in the immediate vicinity above the touch-sensitive surface of the display area for the first period T1, wherein upon activating the multimedia list element a number of multimedia control elements are displayed at an edge of the display area together with the plurality of multimedia list elements;

detecting, after the activation of the multimedia list element, a first swiping movement of the actuating object on, or in the vicinity of, the touch-sensitive surface that takes place at least over a minimum distance S during a second time period T2; and responsive to the detection of the first swiping movement of the actuating object, removing at least non-activated multimedia list elements entirely from the display area and simultaneously inserting into the display area an additional multimedia element comprising further information allocated to the activated multimedia list element, such that during but before the detection of the first swiping movement of the actuating object, the additional multimedia element moves partly into the display area as the plurality of multimedia list elements move successively out of the display area until completion of the detection of the first swiping movement occurs, wherein the number of multimedia control elements are moved into the display area in correspondence with the additional multimedia element during the first swiping movement, wherein the number of multimedia control elements are arranged at a second position, in response to the detection of the first swiping movement, further wherein the display area snaps back to the list view, and the number of multimedia control elements move together with the plurality of multimedia list elements when the actuating object is removed from the touch-sensitive surface before completion of the detected first swiping movement.

15. The device of claim 14, wherein the electronic device to be operated is an infotainment system of a vehicle, wherein the device may be an integrated part of the infotainment system of the vehicle or a mobile device communicating with the infotainment system of the vehicle, in particular a mobile telephone, a smartphone or PDA.

16. The device of claim 15, wherein the mobile device is one of mobile telephone, a smartphone or a PDA.

17. The device of claim 14, wherein the number of multimedia control elements are arranged between the additional multimedia element and the non-activated multimedia list elements during movement onto the display area.

18. The device of claim 14, wherein in response to the detection of the first swiping movement of the actuating object, the number of multimedia control elements are arranged at an opposite edge of the display area.

19. A device for displaying multimedia information on an electronic device, the device comprising:
a display device having a display area;
a touch-sensitive surface which is formed on the display area; and
a control device which is coupled to the display device and the touch-sensitive surface, on the one hand, and the electronic device to be operated, on the other hand, wherein the control device is designed for performing the method comprising:

displaying a plurality of multimedia list elements in a list view on the display area having the touch-sensitive surface;

detecting a contact of a multimedia list element of the plurality of multimedia list elements on the touch-sensitive surface by an actuating object or an approach of an actuating object to the multimedia list element at least, for a first period T1, whereupon the multimedia list element is activated in response to the detection of the contact, wherein upon activation of the multimedia list element a number of multimedia control elements are displayed at an edge of the display area together with the plurality of multimedia list elements;

detecting, after the activation of the multimedia list element of the plurality of multimedia list elements, a first swiping movement of the actuating object on or in the vicinity of the touch-sensitive surface;

determining, as a changeover event, that the first swiping movement achieves at least a minimum distance S on the touch-sensitive surface during a second time period T2; and removing at least non-activated multimedia list elements from the display area, responsive to the determination of a changeover event, and inserting into the display area an additional multimedia element comprising further information allocated to the activated multimedia list element, wherein, during the first swiping movement of the actuating object but before the determination of a changeover event, the additional multimedia element simultaneously moves partly into the display area as the plurality of multimedia list elements move successively out of the display area until completion of the detection of the first swiping movement occurs, wherein the number of multimedia control elements are moved into the display area in correspondence with the additional multimedia element during the first swiping movement, wherein the number of multimedia control elements are arranged at a second position, in response to the detection of the first swiping movement, further wherein the display area snaps back to the list view, and the number of multimedia control elements move together with the plurality of multimedia list elements when the actuating object is removed from the touch-sensitive surface before completion of the detected first swiping movement.

20. The device of claim 19, wherein a direction from which the additional multimedia element moves onto the display area corresponds to the direction of the first swiping movement.

21. The device of claim 19, wherein an amount by which the additional multimedia element moves onto the display area and by which the plurality of multimedia list elements move out of the display area corresponds to the distance achieved by the first swiping movement less than the minimum distance S.

22. The device of claim 19, wherein the number of multimedia control elements are arranged between the additional multimedia element and the non-activated multimedia list elements during movement onto the display area.

23. The device of claim 19, wherein in response to the detection of the first swiping movement of the actuating object, the number of multimedia control elements are arranged at an opposite edge of the display area.

* * * * *